No. 800,187. PATENTED SEPT. 26, 1905.
W. M. VENABLE.
APPARATUS FOR AERATING POLLUTED LIQUIDS.
APPLICATION FILED NOV. 15, 1904.

Witnesses
John H. Duvall
M. Turner

William M. Venable
Inventor
by Benjamin Price
Attorney

UNITED STATES PATENT OFFICE.

WILLIAM MAYO VENABLE, OF CINCINNATI, OHIO, ASSIGNOR TO SANITARY ENGINEERING COMPANY, A CORPORATION OF NEW YORK.

APPARATUS FOR AERATING POLLUTED LIQUIDS.

No. 800,187. Specification of Letters Patent. Patented Sept. 26, 1905.

Application filed November 15, 1904. Serial No. 232,816.

*To all whom it may concern:*

Be it known that I, WILLIAM MAYO VENABLE, a citizen of the United States, and a resident of the city of Cincinnati, Hamilton county, in the State of Ohio, have invented a new and useful Improvement in Apparatus for Aerating Polluted Liquids, of which the following is a full description.

My invention applies to the aeration of these liquids in filter-beds, contact-beds, percolating or other beds or aggregates of material for the filtration and aeration of sewage-water or other polluted liquids by either mechanical or biological processes; and its immediate object is to aerate such beds or material through which the doses of liquid drain or percolate by interposing or furnishing definite channels throughout the beds through which fresh air is distributed into the beds at certain times and foul air expelled therefrom actuated by the passage of the dose through the bed, and this I accomplish in a manner that the fresh air introduced into the beds at different points is kept uncontaminated by the foul air expelled therefrom.

Another object is to introduce the air at such points below the surface of the beds as will be most efficient for purifying the polluted liquid, and thereby be able to use beds much deeper than those in general use.

The accompanying drawings illustrate the invention, of which—

Figure 1:
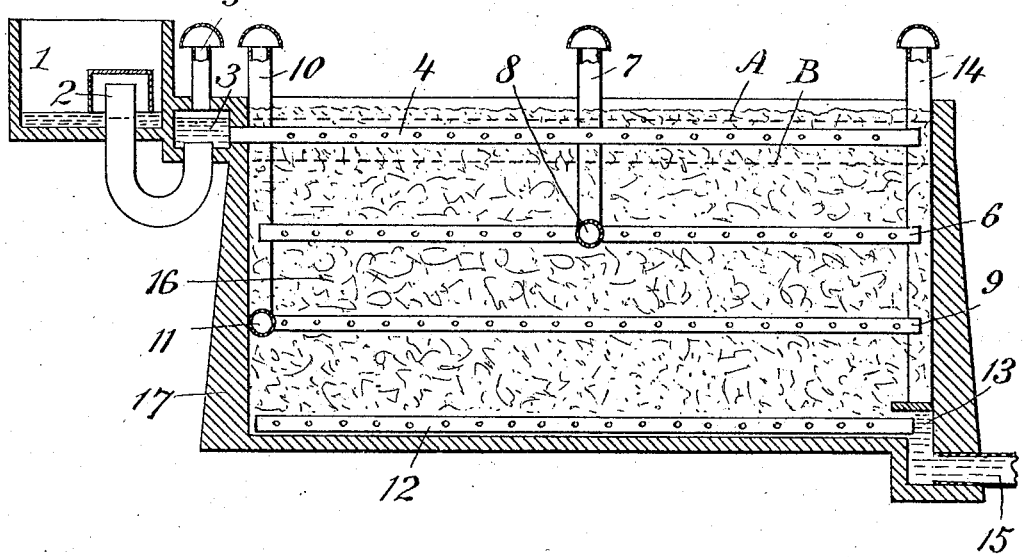
Figure 2:
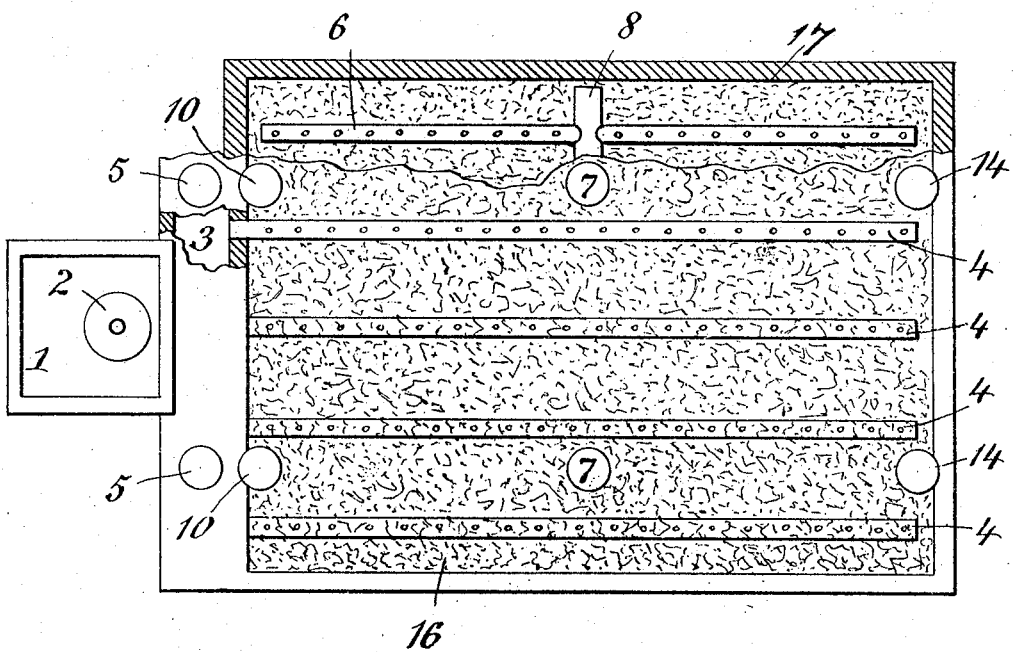

Figure 1 is a vertical section of a deep contact or filter bed provided with the devices for aeration; Fig. 2, a plan view of the same, partly in section, to show the location of a set of pipes below the set at the top.

17 represents the walls of a suitable tank or receptacle, within which is placed the contact or filtering material 16. This material is composed of gravel, coarse sand, crushed stone, clinker, or of any substance which will permit the liquid to percolate or seep therethrough and at the same time form a suitable harbor for the aerobiotic bacteria therein. Throughout this bed I lay a series of pipes in sets, (shown in the drawings at 4, 6, 9, and 12,) located at proper distances apart to insure a supply of air to the bed at the different points of location and to secure a sufficient aeration at all points through the body of the material. These sets of tubes may be multiplied to suit a receptacle of any capacity without altering the principle or mode of operation of the device.

Below the top set 4 the pipes of each set are connected by a header, as shown at 8, 11, and 13. Projecting from the header 8 is the vent-pipe 7, from 11 the vent-pipe 10, and from 13 the vent-pipe 14. A vent-pipe is also provided for the set which enters the header 3, which is provided with the vent-pipe 5.

1 is a chamber in which the sewage or polluted liquid collects.

2 is an automatic siphon of any of the well-known forms for discharging intermittently a dose of sewage or other polluted liquid.

3 is a header which joins all of the top set of pipes 4 and into which the liquid first enters, and from thence into the set of pipes 4. These pipes, as shown in the drawings, as well as the sets 6, 9, and 12, are provided with openings into the filtering material. When the liquid enters the set 4, it percolates into the bed and fills up a space therein, which may be represented by the dotted lines A and B, filling the interstices of the bed within this space. This stratum or layer of sewage percolates downward, and as it descends through the bed it drives before it the foul air and gases, which escape through the headers and pipes below, and draws after it from the surface of the bed fresh air to fill the interstices previously occupied by the descending liquid. When the layer of liquid passes below pipes 6, it continues to drive the foul air downward and out through the pipes, headers, and vents 9, 10, 11, 12, 13, and 14. At the same time fresh air is drawn into the bed through pipes 6, headers 8, and vents 7. When the liquid passes below pipes 9, the foul air is expelled through pipes 12, header 13, and vent 14 and fresh air is drawn in through pipes 9, header 11, and vent 10.

It is obvious that the number of sets of pipes, headers, and vents may be increased indefinitely, depending upon the distance that a dose of liquid can percolate downward as a body and drive the foul air before it. It is also obvious that it is not essential to the invention to use the specific form of connection, as shown by the headers to connect the lines of pipes in any set to a common vent. It is only necessary that each set of pipes be connected to a vent of adequate capacity not directly communicating with the pipes of another set. The headers show one of many means by which this is accomplished.

When the sewage is received into the bed in doses and discharged from the bed in doses, the bed operates as a combined seepage, filter, and contact bed, and the ventilation effected by this means is very superior, as the discharging of the dose from the bed is a positive means of drawing fresh air into the place where it is most needed—at the bottom of the bed. Where combination beds of this kind are used, the preferred arrangement would consist of but three sets of channels, each separately ventilated, the uppermost serving to receive and distribute the liquid as well as for ventilation and the lowermost serving to collect and discharge the liquid from the bed as well as for ventilation.

From the above description it is obvious that the discharge from the beds may be continuous, or by arranging at the discharge-outlet any of the automatic discharge devices, such as the siphon shown at 2, Fig. 1, the beds may be discharged intermittently.

It is not necessary that the filtering material should all be of the same consistency or character. The bed may be formed of an aggregate of different materials, such as crushed stone of various degrees of coarseness and sand deposited in layers. The arrangement of such material in layers may assist in keeping the dose in a body, and therefore increase the depth which it is practicable to employ in a single bed. Nor is it essential to the invention that the liquid be discharged into the bed in the manner shown by the drawings. The upper set of pipes might be omitted and the polluted liquid poured on the surface of the bed or run on in open ditches. In places where beds are exposed to very cold weather and are likely to freeze on the surface the delivery-pipes should be placed at such distance below the surface as will protect them from frost.

What I claim, and desire to secure by Letters Patent, is—

1. In a device for aerating polluted liquid, a percolating-filter provided with sets of ventilating-channels embedded in it at different elevations, each such set of pipes provided with a separate passage to outer air, in combination with means for delivering liquid into the upper portion of the filter in sudden doses each of which entraps the foul air and forces it out of the bed through each set of the ventilating-channels below it, and draws fresh air into the beds through each set of channels above it, as it descends.

2. In a device for aerating polluted liquids, a bed of suitable material for receiving the liquid and adapted to allow it to percolate downward; means for distributing liquid in the upper portion of the bed in sudden doses to fill the interstices in the filtering material in said portion and to entrap the air beneath; in combination with channels arranged throughout the bed in sets at different elevations, all channels having openings into the bed, and each set provided with one or more separate passages to the outer air, through which foul air entrapped beneath the dose may be expelled, and fresh air drawn in after the passage of the dose.

3. In a device for the aerating of polluted liquids, a bed of material suitable for receiving the liquid and adapted to allow it to percolate; means for distributing the liquid in the upper portion of the bed in doses and means for withdrawing the liquid from the lower portion of the bed; in combination with two or more sets of channels arranged in the filtering material at different elevations, each set separately connected to outer air, and provided with openings into the filtering material for the passage of air into and out of the filtering material as the doses percolate downward through the bed, the fresh air being drawn in and the foul air forced out alternately by the weight of the successively-descending doses of liquid.

4. In a device for aerating polluted liquids, a purification-filter provided with several sets of channels embedded at different elevations, each set equipped with a vent, in combination with means for distributing the liquid in the upper portion of the bed in successive doses, each of which descends by reason of its weight, drives the air out of the bed through the channels beneath the dose and draws fresh air in through the channels above the dose, the air always being driven out through a set of channels at a lower elevation than that at which it entered.

In testimony whereof the said WILLIAM M. VENABLE has signed his name to this specification, in the presence of two subscribing witnesses, this 20th day of August, 1904.

WILLIAM MAYO VENABLE.

Witnesses:
L. A. MELLA,
GEORGE A. SCHILLS.